(12) United States Patent
Kawakami (10) Patent No.: US 7,192,357 B2
(45) Date of Patent: Mar. 20, 2007

(54) DYNAMIC DAMPER WITH MULTIPLE DEGREE OF FREEDOM

(75) Inventor: Tetsuya Kawakami, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/347,453

(22) Filed: Jan. 21, 2003

(65) Prior Publication Data
US 2003/0153391 A1 Aug. 14, 2003

(30) Foreign Application Priority Data
Feb. 12, 2002 (JP) ............................. 2002-033589

(51) Int. Cl.
*F16C 3/02* (2006.01)
(52) U.S. Cl. ....................... 464/180; 188/379
(58) Field of Classification Search ................ 464/127, 464/180; 123/192.1; 188/379; 384/158.1; 180/381
See application file for complete search history.

(56) References Cited

U.S. PATENT DOCUMENTS

| | | | |
|---|---|---|---|
| 1,776,125 A * | 9/1930 | Linn ........................... | 464/180 |
| 3,075,406 A * | 1/1963 | Butler, Jr. et al. ....... | 464/180 X |
| 3,075,408 A | 1/1963 | Butler et al. | |
| 4,207,957 A * | 6/1980 | Sivers et al. | |
| 5,326,324 A * | 7/1994 | Hamada ...................... | 464/180 |
| 2003/0176224 A1 * | 9/2003 | Armitage et al. ............ | 464/180 |

FOREIGN PATENT DOCUMENTS

| | | | |
|---|---|---|---|
| GB | 1 462 170 A | | 1/1977 |
| GB | 2 100 832 A | | 1/1983 |
| JP | 03-229036 A | | 10/1991 |
| JP | P2001-21002 A | | 1/2001 |
| JP | 2001-260681 A | | 9/2001 |

OTHER PUBLICATIONS

Universal Joint and Driveshaft Design Manual, AE-7, Society of Automotive Engineers, Inc., Warendale PA, pp. 235 and 259, TJ1079.S62 1979.*
"Mechanical Vibration", pp. 58 to 61, authored by Atsushi Watari and published by Maruzen Kabushiki Kaisha on Apr. 14, 1966.
"Vibration Engineering Handbook", p. 66, (table 3.3 Specific Angular Vibration Frequency) authored by vibration engineering handbook editing community represented by Osamu Taniguchi and published by Kabushiki Kaisha Yogendo on Jul. 10, 1981.

* cited by examiner

*Primary Examiner*—Greg Binda
(74) *Attorney, Agent, or Firm*—McDermott Will & Emery LLP

(57) ABSTRACT

In a dynamic damper including: a torque transmissible tube member; a mass member housed within an inside of the tube member concentrically to the tube member; and a pair of elastic members, both ends of the mass member in a center axis direction of the tube member are coupled to the tube member via the pair of elastic members, the mass member includes a large mass section interposed between the pair of elastic members, a length of the mass member in the center axis direction of the tube member is longer than a diameter of the large mass section, and, from among two different bending resonance vibration modes of the tube member, a node of a higher order bending resonance vibration mode is placed at a position between the pair of elastic members.

19 Claims, 7 Drawing Sheets

WEIGHT CENTER

DYNAMIC DAMPER WITH MULTIPLE DEGREE OF FREEDOM

BACKGROUND OF THE INVENTION

1. Field of the Invention

The present invention relates to a dynamic damper to reduce bending vibrations, specifically, relates to the dynamic damper attached onto a torque transmission tube used for a transmission of a driving force of a vehicle.

2. Description of the Related Art

A Japanese Patent Application First Publication No. 2001-21002 published on Jan. 26, 2001 exemplifies a previously proposed dynamic damper to be attached onto a torque transmission tube. The disclosed technique is the dynamic damper such that a mass member is disposed via an elastic member on an inner periphery of a torque transmission tube and a weight center of the mass member and an elastic center of the elastic member are mutually deviated from each other in an axial center direction of the tube so that bending and torsional vibrations of the torque transmission tube are effectively reduced.

SUMMARY OF THE INVENTION

However, only one specific value of a resonance of the bending vibration can be reduced. Hence, a sufficient reduction of the bending vibration cannot be achieved by the previously proposed dynamic damper when a plurality of specific values of resonances of the bending vibrations are present.

It is, hence, an object of the present invention to provide a single dynamic damper which is capable of damping two bending vibrations that a torque transmission tube naturally has and whose specific values of resonances are different from each other.

According to a first aspect of the present invention, there is provided A dynamic damper, comprising: a torque transmissible tube member; a mass member housed within an inside of the tube member concentrically to the tube member; and a pair of elastic members, both ends of the mass member in a center axis direction of the tube member being coupled to the tube member via the pair of elastic members, the mass member including a large mass section formed between the pair of elastic members, a length of the mass member in the center axis direction of the tube member being longer than a diameter of the large mass section, and, from among two different bending resonance vibration modes of the tube member, a node of a higher order bending resonance vibration mode being placed at a position between the pair of elastic members.

According to a second aspect of the present invention, there is provided a dynamic damper, comprising: a torque transmissible tube member; a mass member housed within an inside of the tube member concentrically to the tube member; and a pair of elastic members, both ends of the mass member in a center axis direction of the tube member being coupled to the tube member via the pair of elastic members, a length of the tube member in the center axis direction thereof being longer than a diameter of the mass member, the mass member including a large mass section formed between the pair of elastic members and having a mass larger than any other portion of the mass member, and the pair of elastic members being arranged in such a manner that, from among two different bending resonance vibration modes of the tube member, a node of a higher order bending resonance vibration mode is made coincident with a center between the pair of elastic members.

According to a third aspect of the present invention, there is provided a dynamic damper, comprising: a torque transmissible tube member; a mass member housed within an inside of the tube member concentrically with respect to the tube member; and a pair of elastic members, both ends of the mass member in a center axis direction of the tube member being coupled to the tube member via the pair of elastic members, a length of the tube member in the center axis direction thereof being longer than a diameter of the mass member, the mass member including a large mass section formed between the pair of elastic members and having a mass larger than any other portion of the mass member, and the pair of elastic members being arranged in such a manner that, from among first-order and second-order bending resonance vibration modes of the tube member, a node of the second-order bending resonance vibration mode is made coincident with a center between the pair of elastic members.

According to a fourth aspect of the present invention, there is provided a dynamic damper, comprising: a torque transmissible tube member; a mass member housed within an inside of the tube member concentrically with respect to the tube member; and a pair of elastic members, both ends of the mass member in a center axis direction of the tube member being coupled to the tube member via the pair of elastic members and a length of the tube member in the center axis direction thereof being longer than a diameter of the mass member and the mass member including a large mass section formed on a center portion between the pair of elastic members to set a ratio of different two specific values of resonances that the dynamic damper has to a range between 2.7 and 6.3 and to place, from among two different bending resonance vibration modes of the tube member, a node of a higher order bending resonance vibration mode at a position between the pair of elastic members.

According to a fifth aspect of the present invention, there is provided a dynamic damper, comprising: a torque transmissible tube member; a mass member housed within an inside of the tube member concentrically with respect to the tube member; and a pair of elastic members, both ends of the mass member in a center axis direction of the tube member being coupled to the tube member via the pair of elastic members and a length of the tube member in the center axis direction thereof being longer than a diameter of the mass member and the mass member including a large mass section formed on a center portion between the pair of elastic members to set a ratio of different two specific values of resonances that the dynamic damper has to a range between 2.7 and 6.3 and to place, from among first-order and second-order bending resonance vibration modes of the tube member, a node of the second-order bending resonance vibration mode at a position between the pair of elastic members.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 3:
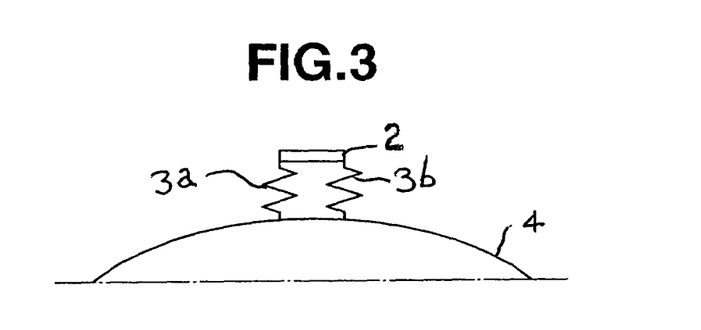
FIG. 3 is an explanatory view for explaining the first order bending vibration mode in a case of a tube member.
Figure 4:
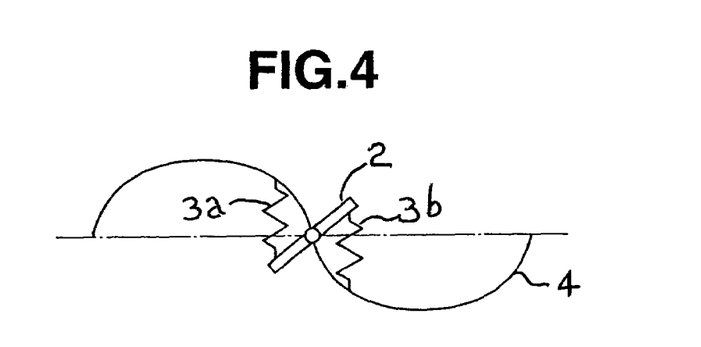
FIG. 4 is an explanatory view for explaining the second order bending vibration of the tube member.

A basic concept of a dynamic damper according to the present invention will be described below. First, a ratio of specific values of bending first order (or primary) resonance and bending second order (or secondary) resonance of a tube member such as a torque transmission tube (or torque transmissible tube member) will be described below. That is to say, if the dynamic damper has the same resonance specific value ratio as a ratio of the specific values of the bending first-order resonance and the bending second-order resonance, it can be expected that a single dynamic damper can damp both of the bending vibrations in the first order and in the second order. It is noted that a term of "a higher order" in the appended claims points to a second order side with respect to a first order side and, in general, points to one of two degrees (order values) which is larger than the other degree (order value). In details, the resonance specific values of the two bending first-order/second-order vibration modes in bending directions as shown in FIGS. 1 and 2 that the dynamic damper naturally has are made coincident with those of the bending first-order modes and bending second-order modes of the tube member as shown in FIGS. 3 and 4 so that the single dynamic damper can damp the vibrations caused by two resonance points.

When the ratio of the resonance specific values between the bending first order resonance of the tube member and the bending second order resonance thereof is calculated from a theoretical equation (for the theoretical equation, refer to a Japanese Engineering Book titled "Mechanical Vibration (Kikai Sindo)", pages 58 to 61, published by Maruzen Kabushiki Kaisha on 1966), the following ratios are derived according to supporting conditions.

a) A case where the tube is supported on both ends thereof, Ft2/Ft1=4.0
b) A case where both ends of the tube are free or fixed, Ft2/Ft1=2.7
c) A case where one end of the tube is fixed and the other end thereof is free, Ft2/Ft1=6.3
d) A case where one end of the tube is fixed and the other end thereof is free or one end of the tube is free and the other end thereof is free, Ft2/Ft1=3.2, wherein Ft1 denotes the resonance specific value of the bending first-order mode of the tube, Ft2 denotes the resonance specific value of the bending second-order mode of the tube member, and wherein Ft2/Ft1 denotes the resonance specific value ratio of the first order and second order bending mode of the tube member.

Figure 1:
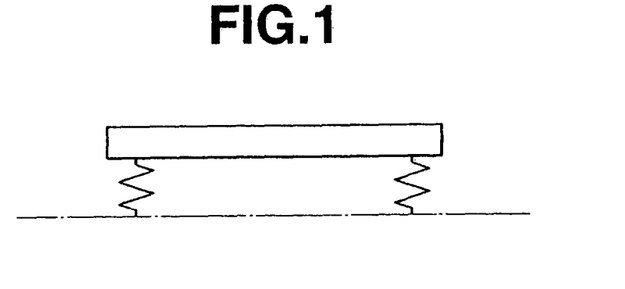
FIG. 1 is an explanatory view for explaining a first order bending vibration mode in a dynamic damper.
Figure 2:
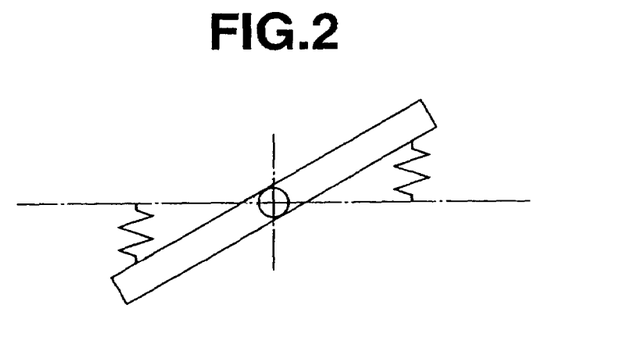
FIG. 2 is an explanatory view for explaining a second order bending vibration mode in the dynamic damper.

Hence, if resonance specific value ratio $Fd\theta/Fdr$ of the two bending modes of the dynamic damper shown in FIGS. 1 or 2 were enabled to be set between the resonance specific value ratios of the bending first-order of 2.7 and bending second-order of 6.3, the dynamic damper can damp both of the first-order bending resonance and the second-order bending resonance.

It is noted that Fdr denotes the resonance specific value in a case where the whole mass member of the dynamic damper is displaced in the same phase (first order mode), $Fd\theta$ denotes the resonance specific value in a case where both ends of the mass member of the dynamic damper are mutually displaced in an opposite phase (second order mode), and $Fd\theta/Fdr$ denotes the resonance specific value ratio of the above-described two displacement modes of the dynamic damper.

Figure 5:
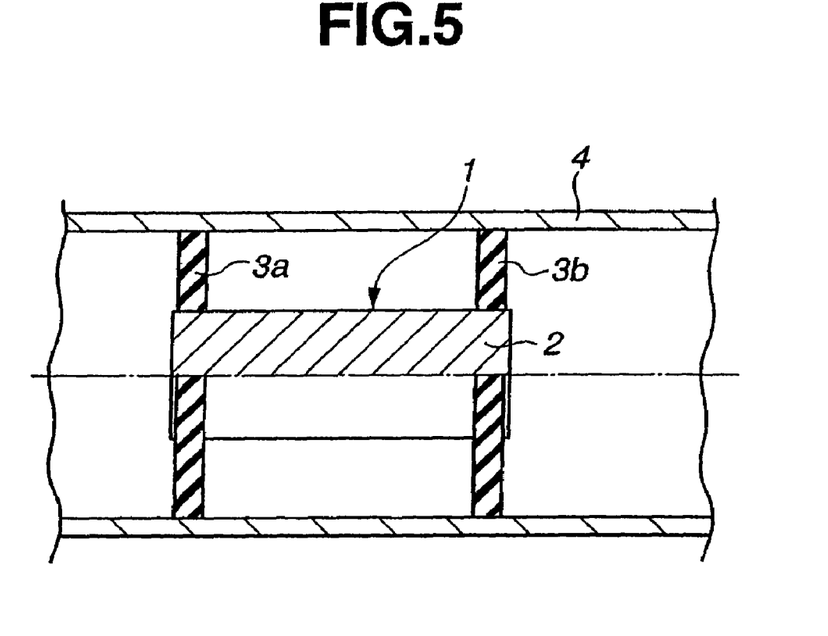
FIG. 5 is a cross sectional view of a comparative example of a dynamic damper.

Next, specifically, Fdr, $Fd\theta$, and $Fd\theta/Fdr$ are calculated using a comparative example of a dynamic damper 1 as shown in FIG. 5. In this example, both ends of a (solid) cylindrical mass member 2 of dynamic damper 1 are supported by a pair of elastic members (for example, rubber members) 3a and 3b and a mass distribution of mass member 2 of dynamic damper 1 in an axial direction is uniform. The details thereof are described in page 66 of a Japanese Technical Book titled "Vibration Engineering Handbook (Shindo Kogaku Handbook)" published by Yogendo on 1981.

Figure 6:
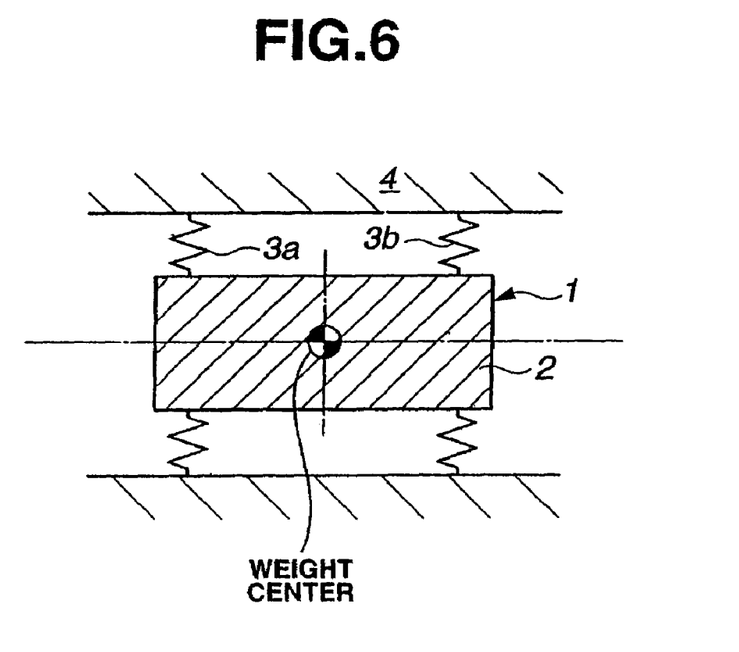
FIG. 6 is a model view representing a modeled comparative example of the dynamic damper shown in FIG. 5.

FIG. 6 is a representation of a vibration model of dynamic damper 1 shown in FIG. 1.

In the following equations, M denotes a mass of mass member 2, I denotes an inertia moment around a weight center of mass member 2, and K denotes a rigidity of elastic member 3. A natural vibration frequency of the vibration model shown in FIG. 6 is expressed in the following equation.

$$\omega^2(n) = \frac{1}{2}\left\{2\frac{K}{M} + \frac{KL^2}{2I}\right\} \pm \sqrt{\left\{2\frac{K}{M} - \frac{KL^2}{2I}\right\}} . \quad (1)$$

Both sides of above equation (1) are multiplied by (M/K) so that the following equation (2) is given.

$$\frac{M}{K} * \omega^2(n) = 1 + \frac{L^2}{\left[\frac{4I}{M}\right]} \pm \sqrt{\left(1 - \frac{L^2}{\left[\frac{4I}{M}\right]}\right)^2} . \quad (2)$$

Consequently, the resonance specific value ratio can be expressed as follows:

$$\{\omega(2)/\omega(1)\}^2 = \left[1 + \frac{L^2}{\left[\frac{4I}{M}\right]} + \sqrt{\left\{1 - \frac{L^2}{\left[\frac{4I}{M}\right]}\right\}^2}\right] / \left[1 + \frac{L^2}{\left[\frac{4I}{M}\right]} + \sqrt{\left\{1 - \frac{L^2}{\left[\frac{4I}{M}\right]}\right\}^2}\right]. \quad (3)$$

In the equation (3), $\omega(1) < \omega(2)$.

Suppose that $B = L^2/(I/M)$. Equation (3) is arranged as follows:

$$\{\omega(2)/\omega(1)\}^2 = \left(1 + \frac{B}{4} + \sqrt{\left(1 - \frac{B}{4}\right)^2}\right) / \left(1 + \frac{B}{4} - \sqrt{\left(1 - \frac{B}{4}\right)^2}\right). \quad (4)$$

Suppose now that an axial length of mass member, 2 of dynamic damper 1 is L and an outer diameter thereof is Do. Then, if the following equation (5) is substituted into B described above, B is derived as in the following equation (6).

$$\frac{I}{M} = \frac{1}{48}(3Do^2 + 4L^2). \quad (5)$$

$$B = L^2 / \left\{\frac{1}{48}(3Do^2 + 4L^2)\right\} \quad (6)$$
$$= 48L^2 / (3Do^2 + 4L^2)$$
$$= 48 / \{3(Do/L)^2 + 4\}.$$

Since Do/L>0, B<12. From equation (4), the resonance specific value ratio is represented by:

$$\{\omega(2)/\omega(1)\}^2 < 3 \quad (7).$$

That is to say, $\omega(2)/\omega(1) < 1.73$ (8).

In a case where a shape of mass member 2 is the cylindrical shape, the resonance specific value ratio is less than 1.73 in spite of the fact of its length of mass member 2 and its outer diameter thereof. Hence, the resonance specific value ratio of mass member 2 in the hollow cylindrical shape of dynamic damper 1 is less than 2.7. Using this shape shown in FIG. 5, both of the bending first-order and the bending second-order resonances of tube member 4 cannot be damped.

Figure 7:
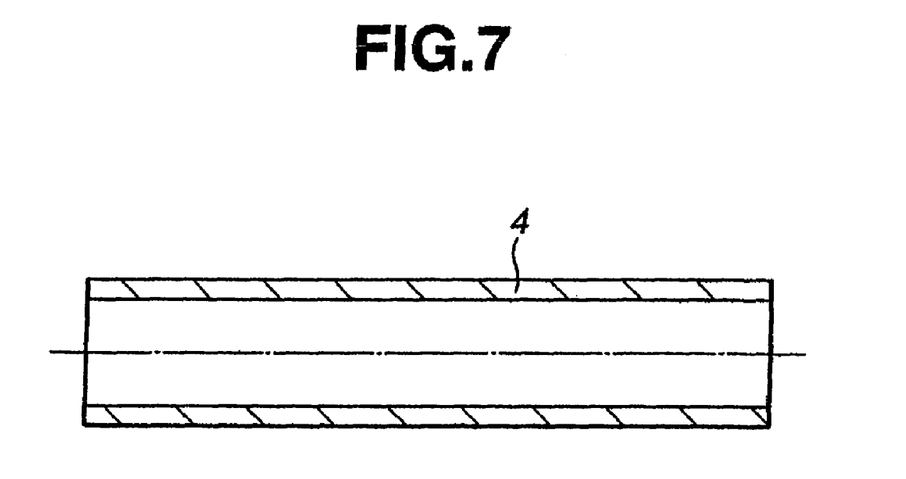
FIG. 7 is a cross sectional view of a torque transmissible tube member to which a dynamic damper according to the present invention is applicable.
Figure 8:
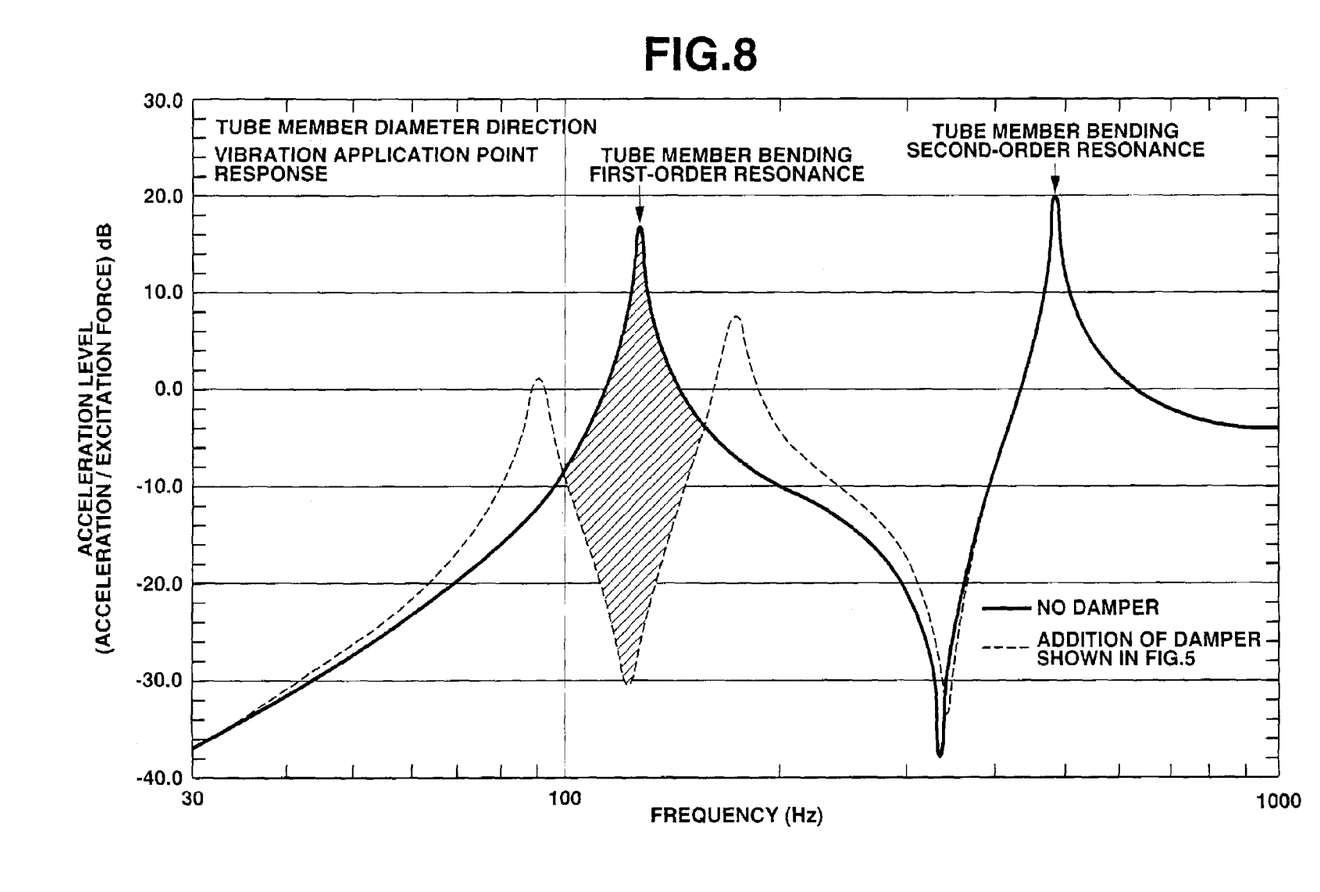
FIG. 8 is a characteristic graph representing a damping effect of the comparative example of the dynamic damper shown in FIG. 5.

Damping effects for the bending first-order and second-order resonances of tube member 4 using a structure such that the comparative example of the dynamic damper shown in FIG. 5 is mounted on a center portion of tube member 4 of a type shown in FIG. 7 wherein both ends of which are supported, corresponding to a propeller shaft, were FEM (Finite Element Method) analyzed. The result of this FEM analysis is shown in FIG. 8. As appreciated from FIG. 8, although the damping effect against the bending first-order resonance can be recognized (refer to a slant line portion in a characteristic graph of FIG. 8), no damping effect is exhibited against the bending second-order resonance.

Figure 9:
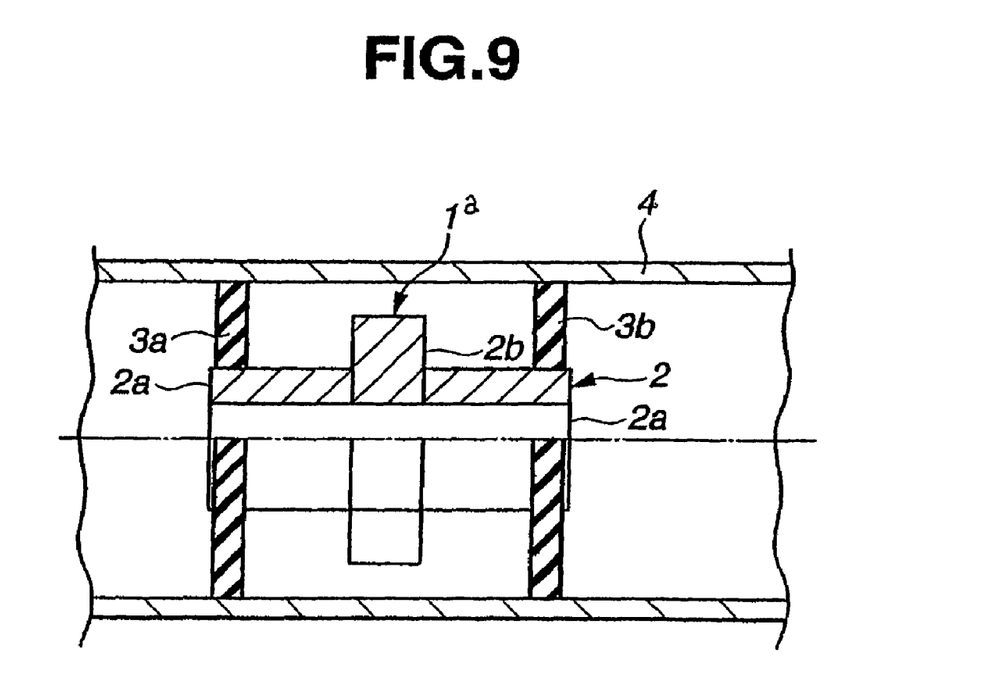
FIG. 9 is a cross sectional view representing a structure of a dynamic damper in a first preferred embodiment according to the present invention.

On the other hand, FIG. 9 shows a dynamic damper in a first preferred embodiment according to the present invention. Dynamic damper $1^a$ is supported by means of pair of elastic members 3a and 3b at both ends of mass member 2 disposed concentrically to tube member 4 and on a center axis of tube member 4. Furthermore, dynamic damper $1^a$ is provided with a large mass section 2b projected toward an outer peripheral side of mass member 2, located at a center portion in a center axis (namely, center axis of tube member 4) of mass member 2 having a hollow cylindrically shaped basic shape portion 2a in order to reduce weight thereof, and disposed in a ring shape. It is noted that large mass section 2b is integrally formed with basic shape portion 2a using the same material as the other position of mass member 2 and is constructed in such a way that a difference in its cross sectional area causes the mass to be enlarged. However, the present invention is not limited to this. Different materials as those other portions of basic shape portion 2a may be used for the center portion which forms large mass section 2b. In other words, dynamic damper $1^a$ may be formed merely in the cylindrical form, its center portion may use a material having a larger specific gravity than another material of which the other portion of basic shape portion 2a is formed. In this case, a degree of freedom in setting the shape of mass member 2 can be increased. It is noted that the axis described hereinafter denotes the center axis of tube member 4, viz., points to the center axis of dynamic damper $1^a$. As shown in FIG. 9, the mass member 2 has the center axis of the tube member 4 as a center and an outer diameter of the large mass section 2b is longer than that of any other portion of the mass member 2 in a direction normal to the center axis of the tube member 4. As further shown in FIG. 9, shape of mass member 2 is such that a length in the axial direction thereof is longer than a the diameter of large mass section 2b.

Furthermore, a rotation center of the bending second-order vibration mode of dynamic damper $1^a$ shown in FIG. 9, in other words, a center position between the pair of elastic members 3a and 3b is made coincident with a node of the bending second-order vibration mode of tube member 4 shown in FIG. 7.

Figure 14:
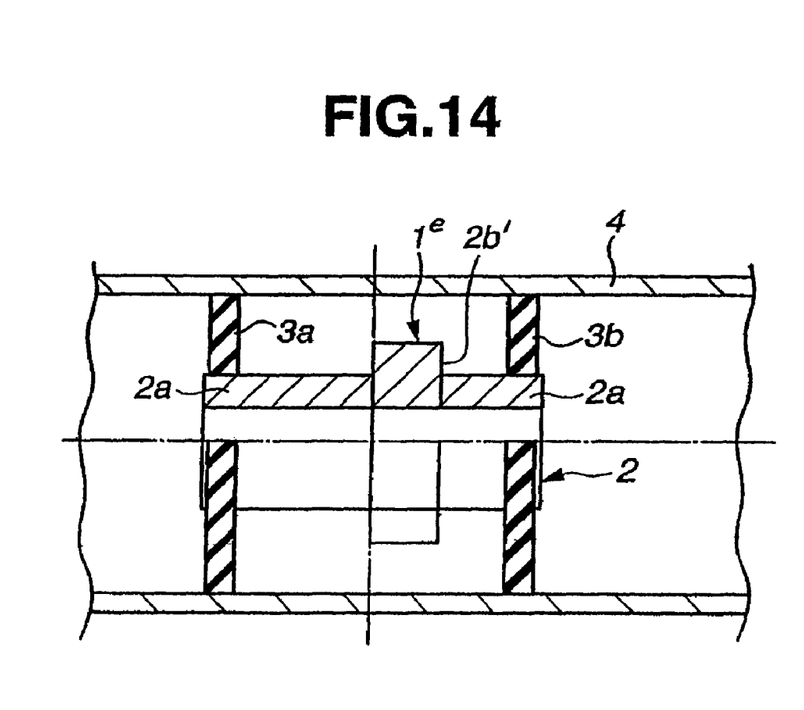
FIG. 14 is a cross sectional view of the dynamic damper in a fifth preferred embodiment according to the present invention.

As described above, the center portion in the axial direction of mass member 2 (large mass section 2b) is heavier than any other portions so that an inertia moment around the weight center of dynamic damper $1^a$ that is shown in FIG. 9 is reduced with respect to the mass and the resonance specific value ratio that dynamic damper $1^a$ has can be augmented. For example, the resonance specific value ratio is 3.2 for the shape of the dynamic damper $1^a$, which is shown in FIG. 9, so that the damping effect can be provided for both the bending first-order resonance and the bending second-order resonance. Furthermore, since a maximum value of the mass distribution of dynamic damper $1^a$ (large mass section 2b) is set at the axial center portion of mass member 2, the rotation center of dynamic damper $1^a$ can be made coincident with the node of the bending second-order mode of tube member 4. Thus, the damping effect can further be improved. In this embodiment, although the rotation center (large mass section 2b) of dynamic damper $1^a$ is made coincident with the node of the bending second-order mode of tube member 4, it is not always necessary for the rotation center to be made coincident with the node described above in order to obtain the above-described effects. For example, if the rotation center is set between the pair of elastic members 3a and 3b via which mass member 2 is linked to tube member 4, as shown in FIG. 14 (the details of which will be described later), and is not made coincident with the above-described node (i.e., if the large mass section 2b is arranged so as to be offset to the node) damping effects against both of the bending first-order and second-order resonances can be expected, and a torsional vibration of tube member 4 can be dampened.

Figure 10:
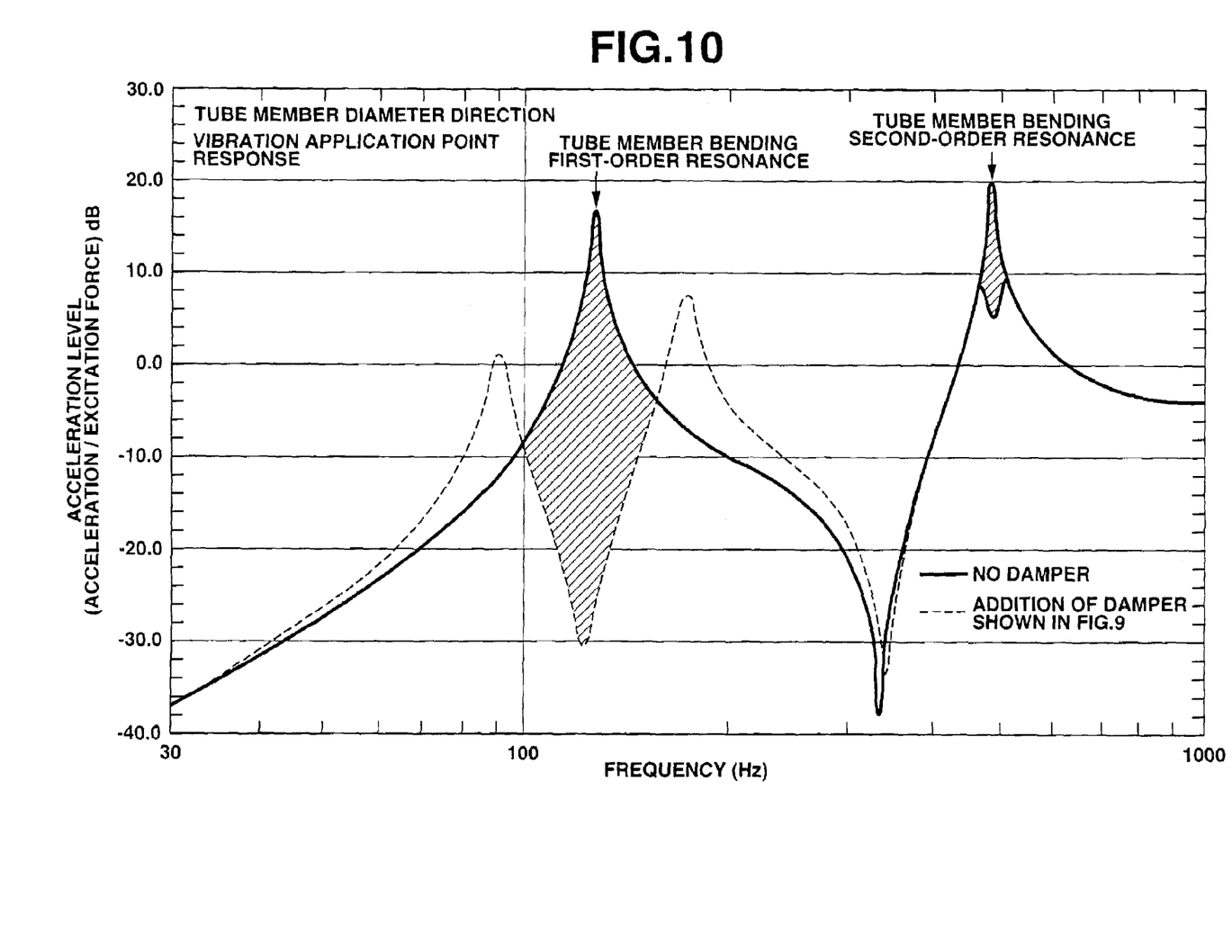
FIG. 10 is a characteristic graph representing a damping effect of the dynamic damper shown in FIG. 9.

FIG. 10 shows another result of the FEM analysis of the damping effects for the bending first-order and second-order resonances of tube member 4 in a case where dynamic damper $1^a$ shown in FIG. 9 is mounted on tube member 4 corresponding to the vehicular propeller shaft. As appreciated from FIG. 10, while the damping effect against the vibration due to the bending first-order resonance in the same way as the case of FIG. 8 is secured, it will be appreciated from the result of FEM analysis shown in FIG. 10 that the vibration of the bending second-order resonance can be damped.

Figure 11:
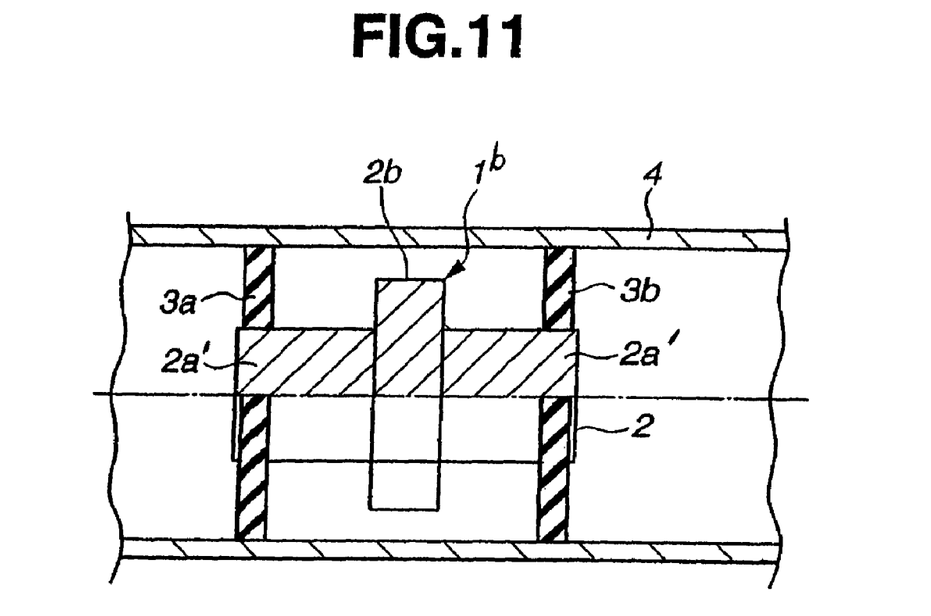
FIG. 11 is a cross sectional view of the dynamic damper in a second preferred embodiment according to the present invention.
Figure 12:
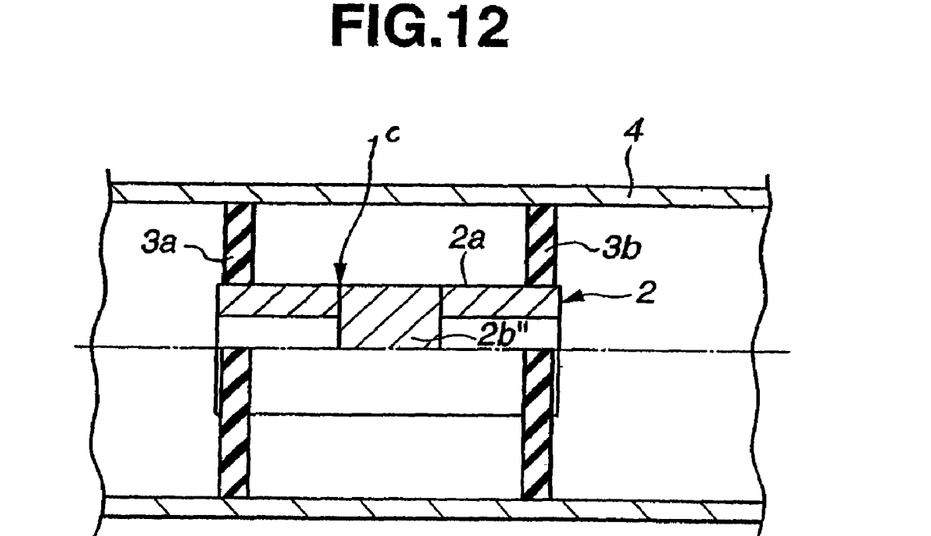
FIG. 12 is a cross sectional view of the dynamic damper in a third preferred embodiment according to the present invention.

FIG. 11 shows a second preferred embodiment of dynamic damper $1^b$. In FIG. 11, basic shape section $2a'$ of dynamic damper $1^b$ is of a solid cylindrical shape instead of the hollow cylindrical shape shown in FIG. 9 of the first embodiment. FIG. 12 shows a third preferred embodiment of dynamic damper $1^c$. In FIG. 12, large mass section $2b'''$ projected toward the inner peripheral side of mass member 2 is installed at the axial center of mass member 2 having hollow cylindrical basic shape portion 2a so that the maximum value of the mass distribution of dynamic damper $1^c$ is set at the axial center of dynamic damper $1^c$. Even in such a structure as described in the third embodiment of dynamic damper with reference to FIG. 12, the shape of dynamic damper $1^c$ is set in such a way that its axial center gives maximum in the mass distribution so that dynamic damper $1^c$ enlarges the ratio of the specific value of the bending first-order and second-order resonances by the single dynamic damper $1^c$ and can damp the vibrations due to the bending first order and second order resonances of tube member 4 described above.

Figure 13:
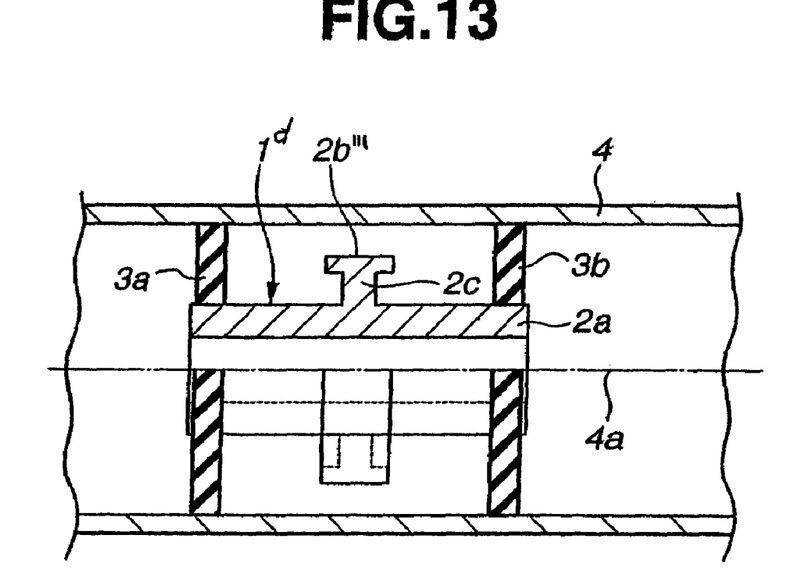
FIG. 13 is a cross sectional view of the dynamic damper in a fourth preferred embodiment according to the present invention.

FIG. 13 shows a fourth preferred embodiment of dynamic damper $1^d$ according to the present invention. In FIG. 13, the shape of mass member 2 includes: a hollow cylindrical portion 2a with an axis 4a of tube member 4 as a center; a ring section $2b'''$ concentrically disposed on the axial center of hollow cylindrical portion 2a with axis 4a of tube member 4 as a center; and a linkage section 2c to link the cylindrical portion 2a and ring section $2b'''$ and having a smaller axial dimension than ring section $2b'''$. In dynamic damper $1^d$ of the fourth embodiment shown in FIG. 13, a further lightweight mass member $2b'''$ can be achieved while maintaining the damping effects to the vibrations caused by the bending first-order and second-order resonances of tube member 4.

FIG. 14 shows a fifth embodiment of dynamic damper $1^e$ according to the present invention. In FIG. 14, large mass section $2b'$ set at the axial center of mass member 2 in the case of either dynamic damper $1^a$ in the first embodiment or dynamic damper $1^b$ in the second embodiment is, in turn, arranged with the offset from the axial center of mass member 2. Thus, the damping effect for the torsional vibration of tube member 4 can be generated together with achieving the damping effects of the vibration due to the bending first-order and second-order resonances of tube member 4.

It is noted that, in each of the first through fifth embodiments, the structure of each dynamic damper $1^a$ through $1^e$ is set so that the vibrations due to the bending first-order and second-order resonances of tube member 4 are damped. However, the structure of the dynamic damper can be set so as to obtain the damping effect of the vibrations due to the resonance in other orders (degrees).

The present invention is not limited to those embodiments described above and it is apparent that various changes and modifications may be made without departing from the sprit and scope of the present invention which is defined in the appended claims.

The entire contents of a Japanese Patent Application No. 2002-033589 (filed in Japan on Feb. 12, 2002) are herein incorporated by reference. The scope of the invention is defined with reference to the following claims.

What is claimed is:

1. A dynamic damper assembly comprising:
a torque transmissible tube member;
a dynamic damper housed within the torque transmissible tube member, the dynamic damper including:
a mass member housed within an inside of the tube member in a center axis direction of the tube member being coupled to the tube member via a pair of elastic members, the mass member including a large mass section formed between the pair of elastic members, a length of the mass member in the center axis direction of the tube member being longer than a diameter of the large mass section, from among first-order and second-order bending resonance vibration modes of the tube member, a node of the second-order being resonance vibration mode being placed at a position between the pair of elastic members, and the elastic members to set a ratio of two different specific values of resonances that the dynamic damper has to a range between 2.7 and 6.3.

2. The dynamic damper assembly as claimed in claim 1, wherein the large mass section is formed on a center of the mass member between the pair of elastic members.

3. A dynamic damper assembly as claimed in claim 2, wherein the mass member is formed in a solid cylindrical shape with a center axis of the tube member as a center and an outer diameter of the large mass section is longer than that of any other portion of the mass member.

4. The dynamic damper assembly as claimed in claim 2, wherein the mass member is formed in a hollow cylindrical shape with a center axis of the tube member as a center and an outer diameter of the large mass section is longer than that of any other portion of the mass member in a direction normal to the center axis of the tube member.

5. A dynamic damper assembly as claimed in claim 2, wherein the mass member comprises: a hollow cylindrical shape section with a center axis of the tube member as a center; a ring section arranged concentrically to the center axis of the tube member; and a linkage section that links the hollow cylindrical shape section with the ring section and has an axial dimension smaller than the ring section.

6. The dynamic damper assembly as claimed in claim 2, wherein the mass member is formed in a cylindrical shape with a center axis of the tube member as a center and the large mass section is formed of a material having a larger specific gravity than that of any other portion of the mass member.

7. A dynamic damper assembly as claimed in claim 2, wherein the mass member is formed in a hollow cylindrical shape with a center axis of the tube member as a center and the large mass section is formed in a solid cylindrical shape whose outer diameter is equal to that of any other portion of the mass member.

8. A dynamic damper assembly as claimed in claim 2, wherein the mass member is formed in a solid cylindrical shape with a center axis of the tube member as a center and an outer diameter of the large mass section is longer than that of any other portion of the mass member.

9. A dynamic damper assembly as claimed in claim 1, wherein the large mass section is formed at the position between the pair of elastic members which is offset from a center between the pair of elastic members.

10. A dynamic damper assembly as claimed in claim 1, wherein the large mass section is formed at a position between the pair of elastic members which is offset from the center between the pair of elastic members.

11. A dynamic damper assembly comprising:
a torque transmissible tube member;
a dynamic damper housed within the torque transmissible tube member, the dynamic damper including:
a mass member housed within an inside of the tube member concentrically with respect to the tube member; and
a pair of elastic members, both ends of the mass member in a center axis direction of the tube member being coupled to the tube member via the pair of elastic members, a length of the tube member in the center axis direction thereof being longer than a diameter of the mass member, the mass member including a large mass section formed between the pair of elastic members and having a mass larger than any other portion of the mass member, the pair of elastic members being arranged in such a manner that, from among first-order and second-order bending resonance vibration modes of the tube member, a node of the second-order bending resonance vibration mode is made coincident with a center between the pair of elastic members, and the elastic members to set a ratio of two different specific values of resonances that the dynamic damper has to a range between 2.7 and 6.3.

12. The dynamic damper assembly as claimed in claim 11, wherein the large mass section is formed on the center between the pair of elastic members.

13. A dynamic damper assembly as claimed in claim 12, wherein the mass member is formed in a solid cylindrical shape with a center axis of the tube member as a center and an outer diameter of the large mass section is longer than that of any other portion of the mass member.

14. The dynamic damper assembly as claimed in claim 12, wherein the mass member is formed in a hollow cylindrical shape with a center axis of the tube member as a center and an outer diameter of the large mass section is longer than that of any other portion of the mass member in a direction normal to the center axis of the tube member.

15. A dynamic damper assembly as claimed in claim 12, wherein the mass member comprises: a hollow cylindrical shape section with a center axis of the tube member as a center; a ring section arranged concentrically to the center axis of the tube member; and a linkage section that links the hollow cylindrical shape section with the ring section and has an axial dimension smaller than the ring section.

16. The dynamic damper assembly as claimed in claim 12, wherein the mass member is formed in a cylindrical shape with a center axis of the tube member as a center and the large mass section is formed of a material having a larger specific gravity than that of any other portion of the mass member.

17. A dynamic damper assembly as claimed in claim 12, wherein the mass member is formed in a hollow cylindrical shape with a center axis of the tube member as a center and the large mass section is formed in a solid cylindrical shape whose outer diameter is equal to that of any other portion of the mass member.

18. A dynamic damper assembly as claimed in claim 11, wherein the large mass section is formed at a position between the pair of elastic members which is offset from the center between the pair of elastic members.

19. A dynamic damper assembly comprising:
a torque transmissible tube member;
a dynamic damper housed within said torque transmissible tube member, said dynamic damper including:
a mass member housed within an inside of the tube member concentrically with respect to the tube member; and
a pair of elastic members, both ends of the mass member in a center axis direction of the tube member being coupled to the tube member via the pair of elastic members and a length of the tube member in the center axis direction thereof being longer than a diameter of the mass member and the mass member including a large mass section formed on a center portion between the pair of elastic members to set a ratio of different two specific values of resonances that the dynamic damper has to a range between 2.7 and 6.3 and to place, from among first-order and second-order bending resonance vibration modes of the tube member, a node of the second-order bending resonance vibration mode being placed at a position between the pair of elastic members.

* * * * *